United States Patent [19]

Miller et al.

[11] Patent Number: 5,084,178

[45] Date of Patent: Jan. 28, 1992

[54] CORRUGATED FILTER ARRANGEMENT WITH SUPPORT LAYER AND FLOW CHANNELS

[75] Inventors: John D. Miller, Ithaca; Joseph R. Swiezbin, Glen Cove, both of N.Y.

[73] Assignee: Pall Corporation, Glen Cove, N.Y.

[21] Appl. No.: 323,217

[22] Filed: Mar. 15, 1989

Related U.S. Application Data

[63] Continuation of Ser. No. 206,676, Jun. 15, 1988, abandoned.

[51] Int. Cl.⁵ .............................................. B01D 29/07
[52] U.S. Cl. ................................... 210/493.5; 55/521; 55/524; 156/474; 210/496; 210/500.26; 210/500.29
[58] Field of Search ................... 55/521, 524, DIG. 5; 210/487, 493.1, 493.2, 493.5, 496, 500.26, 500.29, 504, 505, 508, 510.1, DIG. 5; 156/204, 474

[56] References Cited

U.S. PATENT DOCUMENTS

| | | | |
|---|---|---|---|
| 3,057,481 | 10/1962 | Pall | 210/510.1 |
| 3,165,473 | 1/1965 | Pall et al. | 210/510 |
| 3,189,179 | 6/1965 | McMichael | 210/493.1 |
| 3,280,985 | 10/1966 | Czerwonka | 210/493.5 |
| 3,520,417 | 7/1970 | Durr et al. | 210/493 |
| 3,692,184 | 9/1972 | Miller, Jr. et al. | 210/437 |
| 3,716,970 | 2/1973 | Stupf et al. | 55/521 |
| 3,871,851 | 3/1975 | Neumann | 55/521 |
| 4,033,881 | 7/1977 | Pall | 210/505 |
| 4,154,688 | 5/1979 | Pall | 55/521 |
| 4,252,591 | 2/1981 | Rosenberg | 156/474 |
| 4,589,983 | 5/1986 | Wydevan | 210/489 |
| 4,665,050 | 5/1987 | Degen et al. | 210/496 |
| 4,735,720 | 4/1988 | Kersting | 210/493.1 |

FOREIGN PATENT DOCUMENTS

| | | | |
|---|---|---|---|
| 2034669 | 7/1970 | Fed. Rep. of Germany | |
| 3219671 | 5/1982 | Fed. Rep. of Germany | |
| 8118562 | 9/1981 | France | |
| 763917 | 12/1956 | United Kingdom | 156/474 |
| 1277588 | 12/1968 | United Kingdom | |
| 2156232 | 3/1984 | United Kingdom | |
| 2192810 | 1/1988 | United Kingdom | 210/493.1 |

OTHER PUBLICATIONS

Series of drawings marked "P14 (Reemay 2016) Media @10.900 Slit Width With Hotmelt (Henkel 6300) Beads Hotmelt Bead Dia. 0.014 (Ref.) Hotmelt Bead Spacing 0.3090 Centers" (1987).
Letter from Staffan B. Linnersten to file dated Jun. 12, 1989.

Primary Examiner—Robert A. Dawson
Assistant Examiner—Joseph Drodge
Attorney, Agent, or Firm—Leydig, Voit & Mayer

[57] ABSTRACT

The disclosure describes an arrangement which comprises a porous filter layer and a porous support layer. The porous support layer has first and second surfaces and the porous filter layer is positioned near the first surface of the porous support layer. The filter arrangement further comprises several polymeric beads disposed in parallel strips on the second surface of the porous support layer. The filter arrangement is corrugated to form pleats which extend generally perpendicular to the polymeric beads. Each pleat includes an open end, a bight end, and first and second opposing sides which extend between the open end and the bight end and include a portion within each pleat in which the opposing sides are in essentially parallel relationship. Each bead extends from the open end of the pleat along the first side to the bight end and from the bight end of the pleat along the second side to the open end. The portions of each bead which extend along the parallel portions of the opposing sides of the pleat are joined to one another.

18 Claims, 2 Drawing Sheets

CORRUGATED FILTER ARRANGEMENT WITH SUPPORT LAYER AND FLOW CHANNELS

This application is a continuation of application Ser. No. 07/206,676, filed June 15, 1988, now abandoned.

TECHNICAL FIELD

The present invention relates to a filter arrangement, in particular, a corrugated filter arrangement, for removing one or more substances from a fluid flowing through the filter arrangement.

DISCLOSURE OF THE INVENTION

According to the present invention, a filter arrangement may comprise a porous filter layer and a porous support layer. The porous support layer has first and second surfaces, and the porous filter layer is positioned near the first surface of the porous support layer. The filter arrangement further comprises several polymeric beads disposed in parallel strips on the second surface of the porous support layer. The filter arrangement is corrugated to form pleats which extend generally perpendicular to the polymeric beads. Each pleat includes an open end, a bight end, and first and second opposing sides which extend between the open end and the bight end and include a portion in which the opposing sides are essentially parallel. Each bead extends down into and out from the pleat. Thus, each bead extends from the open end of the pleat along the first side to the bight end and from the bight end of the pleat along the second side to the open end. The portions of each bead which extend along the essentially parallel portions of the opposing sides of the pleat are joined to one another.

The support layer preferably has greater mechanical strength or toughness than the filter layer, which is frequently delicate. Consequently, by disposing the beads on the surface of the support layer rather than directly on the filter layer, the filter layer is protected from tearing or excessive distortion when the filter arrangement is corrugated or used to filter fluids. Further, by joining the opposing portions of each bead with the pleats, flow channels are defined within each pleat. These flow channels are maintained relatively open by the joined portions of the beads even when the filter arrangement is subjected to high pressure liquids or pulsating flow. Thus, a filter arrangement according to the present invention provides more reliable service and a greater service life than many conventional filters.

DESCRIPTION OF EXEMPLARY EMBODIMENTS

Figure 2:
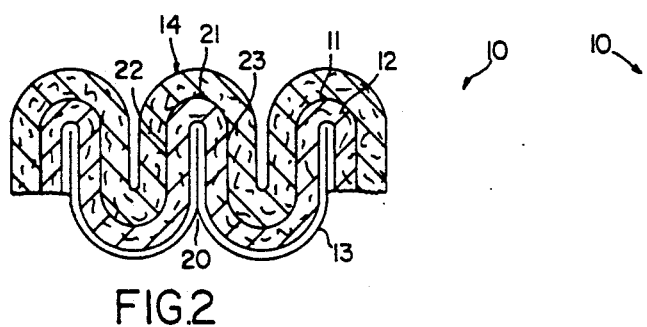
FIG. 2 is a cross-sectional plan view of the corrugated filter arrangement of FIG. 1 as viewed long lines II—II.
Figure 1:
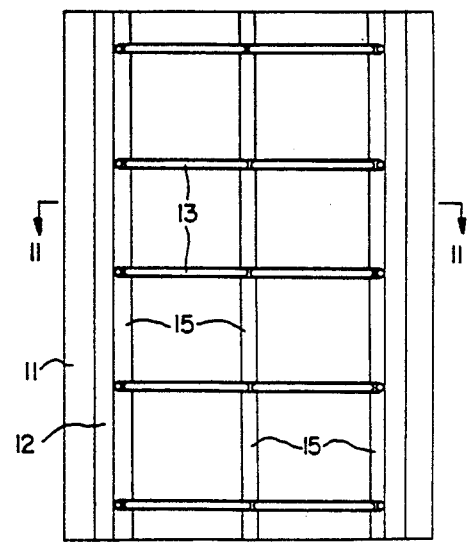
FIG. 1 is an elevation view of a corrugated filter arrangement embodying the present invention.

As shown in FIGS. 1 and 2, one example of a filter arrangement 10 embodying the present invention generally comprises a porous filter layer 11, a porous support layer 12, and several polymeric beads 13 disposed in parallel strips along the support layer 12. The exemplary filter arrangement 10 is corrugated to form pleats 14 which extend generally perpendicular to the beads 13. Within each pleat 14 the beads 13 are joined to themselves to define flow channels 15 within the pleat 13 and ensure proper fluid flow through the pleat 13.

The filter layer 11 may be any suitable filter medium. For example, the filter medium may be fashioned as a membrane or a woven or nonwoven fibrous sheet and may be fabricated from a natural or synthetic polymer or glass. Thus, the filter medium may comprise a nonwoven sheet principally including cellulose fibers or essentially consisting of glass fibers with a resin binder. Further, the filter medium may have any desired pore structure, including a graded pore structure, and any desired rated pore size.

The support layer 12 may be formed from a variety of suitable porous materials. For example, the support layer 12 may be fashioned from a woven or, preferably, nonwoven fibrous sheet and may be fabricated from a natural or synthetic polymer or glass. The rated pore size of the support layer 12 is preferably greater than the rate pore size of the filter layer 11. In accordance with one aspect of the invention, the support layer 12 has greater mechanical strength than the filter layer 11 and, therefore, serves to protect the typically delicate filter layer 11 from tearing or distortion during corrugation or use.

Figure 3:
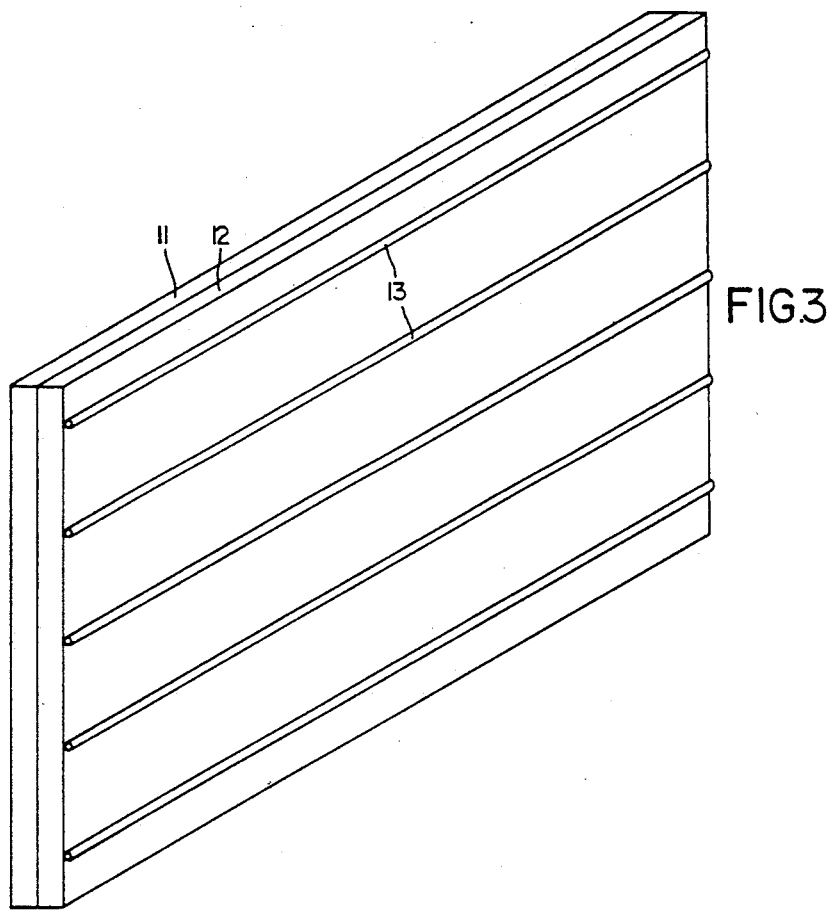
FIG. 3 is a perspective view of an uncorrugated filter arrangement.

The filter layer 11 and the support layer 12 form a composite, as shown in FIG. 3. In the exemplary filter arrangement 10, one surface of the filter layer 11 is disposed immediately adjacent to a first surface of the support layer 12. Alternatively, the composite may include one or more intermediate layers interposed between the filter layer and the support layer. Further, in the exemplary filter arrangement 10, the support layer 12 and beads 13 are disposed along only one surface, preferably the downstream surface, of the filter layer 11. Alternatively, the composite may include a support layer and beads provided along both the upstream surface and the downstream surface of the filter layer.

The polymeric beads may be formed from a variety of materials including many thermoplastic or thermosetting materials. Thus, the polymeric beads may be formed from a material comprising a polyester, polyamide, or polyolefin resin. Further, the polymeric beads 13 may be applied in parallel strips along the second surface of the support layer 12 in any suitable manner. For example, the polymeric beads may be formed from a hot melt adhesive and applied continuously from an evenly spaced multi-orifice dispensing head with the support layer 12 moving under the dispensing head, preferably at a constant velocity, producing several continuous, parallel beads. The hot melt adhesive may be applied to the support layer 12 either before or, preferably, after the support layer 12 and the filter layer 11 have been formed into the composite.

In a modification of this method, the hot melt adhesive may be applied intermittently from the dispensing head or from an unevenly spaced multi-orifice dispensing head to produce several discontinuous, parallel beads or several unevenly spaced parallel beads. In other alternatives, a granular polymeric material may be applied by extrusion from a multi-orifice extrusion head; a plastisol or polyurethane may be applied from a multi-orifice dispenser and then cured with an in-line heating device; or a solvent based adhesive or potting compound may be applied from a multi-orifice dispenser and the solvent may then be flashed by a heating/ventilation device.

As applied to the surface layer 12, the bead material preferably has a surface tension high enough to prevent excessive wetting of the support layer 12 or wicking through the support layer 12 but not so high as to prevent adhesion between the bead 13 and the support layer 12. This minimizes flow restriction through the exemplary filter arrangement since the surface of the support layer 12 which is in contact with the bead 13 is effectively blocked. The contact angle between the bead 13 and the support layer 12, as measured by the Sessile method, may preferably be in the range from about 100° to about 120°.

Figure 4A:
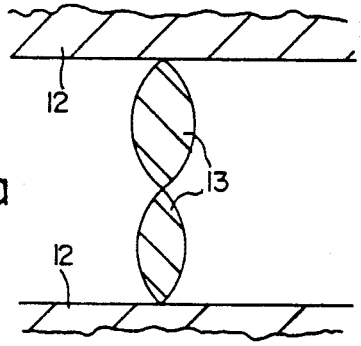
FIGS. 4a–4f are cross-sectional views of various modifications of the polymeric beads of the filter arrangement of FIG. 1.
Figure 4B:
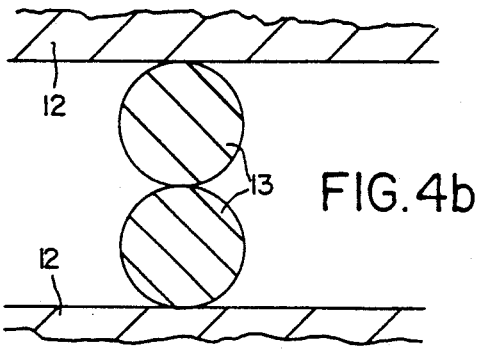
Figure 4C:
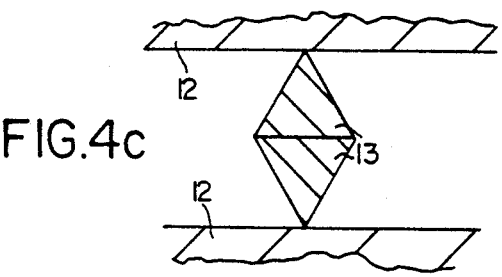
Figure 4D:
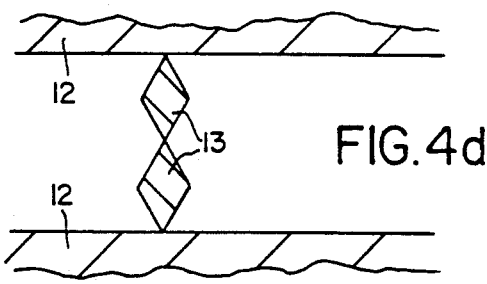
Figure 4E:
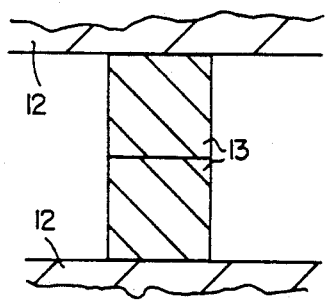
Figure 4F:
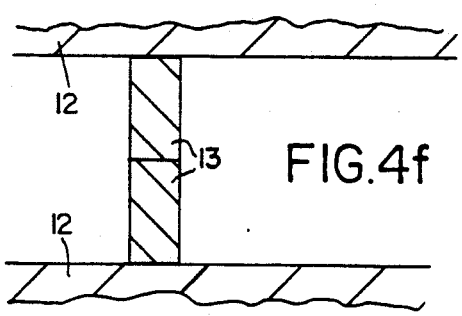

Various suitable cross-sectional shapes of the beads 13 are shown in FIGS. 4a-4f. The most preferred shape is the needle-like cross-section shown in FIG. 4a. This shape minimizes the contact area between the bead 13 and the support layer 12. However, this shape is difficult to produce at reasonable production rates. For large scale production, the circular cross-section shown in FIG. 4b is preferred. Other suitable shapes include the triangular, diamond, square, and rectangular cross-sections shown in FIGS. 4c-4f, respectively.

The size of each bead and the spacing between the beads may vary without departing from the scope of the invention. The size of the beads is determined by the size of the orifice in the dispensing head, the relative velocity between the dispensing head and the support layer 12, and the viscosity of the bead material. For many applications, the diameter of the beads may preferably be in the range from about 4 to about 20 mils.

The spacing between beads is preferably selected so that the stress deformation, i.e., deflection, of the pleated composite does not exceed either of two conditions: (1) the elastic limit of the filter medium comprising the filter layer 11, i.e., the maximum unit of stress beyond which the filter medium will not return to its original shape, is not exceeded and (2) the deflection of the composite during normal operation does not increase the flow resistance in the flow channels 15 more than 10 percent. For many applications, the spacing between evenly spaced beads is preferably such that about 5 to about 20 beads per inch or, most preferably, about 8 to about 15 beads per inch are applied to the support layer 12.

Once the beads 13 have been applied to the support layer 12, the filter layer 11 and the support layer 12 with the beads 13 are fed into a corrugator, e.g., a Chandler "grab and fold" type corrugator or a Rabofsky "cam actuated blade" type corrugator. The filter layer 11 and the support layer 12 may be formed into the composite before being fed into the corrugator or, preferably, the filter layer 11 and the support layer 12 with the beads 13 may be fed individually into the corrugator which then forms the composite at the same time it forms the pleats 14 in the filter arrangement 10.

As shown in FIG. 1, each pleat 14 extends generally perpendicular to the beads 13 and includes an open end 20, a bight end 21, and first and second opposing sides 22, 23. In accordance with another aspect of the invention, the portions of each bead 13 which extend along the opposing sides 22, 23 of each pleat are joined to one another, defining flow channels 15 within each pleat 14 between adjacent beads 13 and the opposing sides 22, 23. Because the support layer 12 and beads 13 are preferably positioned on the downstream surface of the filter layer 11 to resist the pressure drop across the filter arrangement 10 during normal operation, the flow channels 15 are preferably drainage channels.

Care should be taken in the alignment of the support layer 12 within the corrugator to ensure that the beads 13 oppose themselves in the pleats 14. If the beads 13 are formed from a hot melt adhesive, heated panels in the corrugator may be used to tack the beads together. Beads comprising other types of materials may require coating by an adhesive or softening by a solvent for this purpose. After the filter arrangement 10 has been corrugated, it may be desirable to set the tacked beads in a forced convection oven. It may also be desirable to cure any binders in the filter medium of the filter layer 11 at the same time the beads 13 are being set. Alternatively, the beads 13 may be set and the filter medium may be cured in a tunnel oven during a continuous production process. Of course, the setting of the beads and the curing of the filter medium should be done at temperatures which are not deleterious to the other components of the filter arrangement. Further, all of the cured components of the filter arrangement should be compatible with the fluid to be filtered.

In corrugating the filter arrangement 10, and setting the beads 13, each bead 13 in the pleat 14 is preferably joined to itself the entire distance from the bight end 21 to the open end 20 of the pleat 14. Further, the radius at the bight end 21 of the pleat 14 is preferably as small as possible, preferably zero, to maximize resistance to fatigue failure which may result from flexure of the filter arrangement 10 during pulsating flow conditions. However, the beads 13 must not be over-compressed which would cause excessive blinding of the filter arrangement 10 and would reduce the cross-sectional area of the flow channel 15. Thus, when corrugating the filter arrangement 10, it may be desirable to secure the filter arrangement 10 in a spring-loaded fixture with positive stops to prevent over-compression and a slight reverse-curve to ensure the minimum radius at the bight end 21 of the pleat 13.

By joining the opposing portions of each bead 13, the flow channels 15 within each pleat 14 remain relatively open even when the filter arrangement 10 is used to filter a pulsating flow or liquids at high differential pressures, e.g., 50 to 500 psi, across the filter arrangement 10. Thus, a filter arrangement according to the present invention has a greater resistance to flow fatigue and, therefore, provides more reliable service and a greater service life than many conventional filters.

The filter arrangement according to the present invention may be incorporated into a wide variety of filters. For example, the filter arrangement may be incorporated into a flat pack or panel-type filter which could be utilized in in-line or axial flow applications. Alternatively, the filter arrangement may be formed into a generally cylindrical configuration and incorporated, along with any necessary end caps, core, spacers, or exterior restraints, into the cylindrical filter for radial outside-in or inside-out flow applications.

Two specific examples of a filter arrangement according to the present invention are set forth below. These examples are expected to prove particularly effective in use.

EXAMPLE 1

The filter layer is formed from a filter medium principally comprising cellulose fibers such as cotton fibers and further comprising glass fibers to improve efficiency and polyester fibers to improve its strength. These fibers may be bound by a phenolic resin. Such a filter medium is available from James River Corporation. Preferably, the filter medium is not cured prior to corrugation and has a rated pore size in the range from about 3 micron to about 25 microns.

The support layer is a cellulose paper available from Pallflex Corporation under the trade designation D4D. The beads are formed from a polyamide hot melt adhesive available from Henkle Inc. under the trade designation Macromelt 6300 and are continuously applied to the downstream surface of the support layer from an evenly spaced multi-orifice dispensing head. The uncured filter layer and the support layer with the beads are then individually fed to a corrugator which forms the composite with the upstream surface of the support layer lying adjacent to the downstream surface of the filter layer and which also forms pleats extending generally perpendicular to the beads. Within each pleat, the opposing portions of the beads abut one another. Hot plates positioned within the corrugator soften the beads and tack the opposing portions of the beads together. The corrugated filter arrangement is then placed in a spring-loaded fixture with positive stops and a slight reverse curve and is heated in a convection oven to about 325° for about 15 minutes. This heating both sets the joined portion of the beads and cures the filter medium.

EXAMPLE 2

The filter layer is formed from a filter medium consisting essentially of glass fibers with a resin binder. Such a filter medium is available from Hollingsworth and Vose Corporation. Further, this filter media may have a rated pore size in the range from about 1 micron to about 50 microns. The support layer is a paper available from Pallflex Corporation under the trade designation D4D. The beads are formed from a polyamide hot melt adhesive available from Henkle Inc. under the trade designation Macromelt 6300 and are continuously applied to the downstream surface of the support layer from an evenly spaced multi-orifice dispensing head. The filter layer and the support layer with the beads are then individually fed to a corrugator which forms the composite with the upstream surface of the support layer lying adjacent to the downstream surface of the filter layer and also forms pleats extending generally perpendicular to the beads. Within each pleat, the opposing portions of the beads abut one another. Hot plates positioned within the corrugator soften the beads and tack the opposing portions of the beads together. The corrugated filter arrangement is then placed in a spring-loaded fixture with positive stops and a slight reverse curve and is heated in a convection oven to about 325° for about 15 minutes. This heating sets the joined portion of the beads.

Although the present invention has been described in terms of an exemplary embodiment and two examples, it is not limited to this embodiment or these examples. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

We claim:

1. A filter arrangement comprising a porous support layer which has first and second surfaces, a porous filter layer which is positioned near the first surface of the porous support layer, and a plurality of polymeric beads which are disposed in parallel strips on the second surface of the porous support layer, the filter arrangement being corrugated to define pleats extending generally perpendicular to the polymeric beads wherein each pleat includes an open end, a bight end, and first and second opposing sides and includes a portion within each pleat in which the opposing sides are in essentially parallel relationship, and wherein each bead extends from the open end of the pleat along the first side to the bight end and from the bight end of the pleat along the second side to the open end and the portions of each bead which comprise a hot-melt adhesive material and which extend along the essentially parallel portions of the opposing sides of the pleat having been joined to one another by heat-setting.

2. The filter arrangement of claim 1 wherein the porous support layer principally comprises cellulose fibers.

3. The filter arrangement of claim 1 wherein the porous support layer comprises a nonwoven web of fibers.

4. The filter arrangement of claim 1 wherein the porous support layer has a larger rated pore size than the porous filter layer.

5. The filter arrangement of claim 1 wherein the first and second surfaces of the porous support layer respectively comprise upstream and downstream surfaces.

6. The filter arrangement of claim 1 wherein the porous filter layer principally comprises cellulose fibers.

7. The filter arrangement of claim 1 wherein the porous filter layer consists essentially of glass fibers and a resin binder.

8. The filter arrangement of claim 1 wherein the rated pore size of the porous filter layer is no greater than 50 microns.

9. The filter arrangement of claim 1 wherein the porous filter layer has a first surface disposed immediately adjacent to the first surface of the porous support layer.

10. The filter arrangement of claim 1 wherein each bead comprises a continuous strip.

11. The filter arrangement of claim 1 wherein each bead is formed from a material which comprises a polyamide.

12. The filter arrangement of claim 1 wherein each bead is joined to the second surface of the porous support layer.

13. The filter arrangement of claim 1 wherein each bead has a generally circular cross section.

14. The filter arrangement of claim 1 wherein the bead portions are fused to one another.

15. A filter arrangement for removing one or more substances from a fluid flowing through the filter arrangement, the filter arrangement comprising a layer of a porous filter medium which principally includes cellulose fibers and further includes glass fibers, polyester fibers, and a resin binder, the porous filter layer having a downstream surface, a layer of a porous support medium which principally includes cellulose fibers and has a rated pore size greater than the rated pore size of the porous filter layer, the porous support layer having an upstream surface and a downstream surface, the upstream surface of the porous support layer lying adjacent to the downstream surface of the porous filter layer, and a plurality of polyamide beads which comprise a hot-melt adhesive material and which are disposed in continuous, parallel strips on the downstream surface of the porous support layer, the filter arrangement being corrugated to define pleats extending generally perpendicular to the polymeric beads wherein each pleat includes an open end, a bight end, and first and second opposing sides and includes a portion within each pleat in which the opposing sides are in essentially parallel relationship, and wherein each bead extends from the open end of the pleat along the first side to the bight end and from the bight end of the pleat along the second side to the open end and the portions of each bead which extend along the essentially parallel portions of the opposing sides of the pleat having been fused to one another by heat-setting.

16. The filter arrangement of claim 15 wherein the porous filter layer has a rated pore size in the range from about 3 to about 25 microns.

17. The filter arrangement for removing one or more substances from a fluid flowing through the filter arrangement, the filter arrangement comprising a layer of a porous filter medium which consists essentially of glass fibers and a resin binder, the porous filter layer having a downstream surface, a layer of a porous support medium which principally includes cellulose fibers and has a rated pore size greater than the rated pore size of the porous filter layer, the porous support layer having an upstream surface and a downstream surface, the upstream surface lying adjacent to the downstream surface of the porous filter layer, and a plurality of polyamide beads which comprise a hot-melt adhesive material and which are disposed in continuous, parallel strips on the downstream surface of the porous support layer, the filter arrangement being corrugated to define pleats extending generally perpendicular to the polymeric beads wherein each pleat includes an open end, a bight end, and first and second opposing sides and includes a portion within each pleat in which the opposing sides are in essentially parallel relationship, and each bead extends from the open end of the pleat along the first side to the bight end and from the bight end of the pleat along the second side to the open end and the portions of each bead which extend along the essentially parallel portions of the opposing sides of the pleat having been fused to one another by heat-setting.

18. The filter arrangement of claim 17 wherein the porous filter layer has a rated pore size in the range from about 1 to about 50 microns.

* * * * *